United States Patent
Li et al.

(10) Patent No.: US 11,169,743 B2
(45) Date of Patent: Nov. 9, 2021

(54) ENERGY MANAGEMENT METHOD AND APPARATUS FOR PROCESSING A REQUEST AT A SOLID STATE DRIVE CLUSTER

(71) Applicant: Huawei Technologies Co., Ltd., Shenzhen (CN)

(72) Inventors: Xiaochu Li, Dongguan (CN); Dahong Yan, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/808,968

(22) Filed: Mar. 4, 2020

(65) Prior Publication Data
US 2020/0201578 A1  Jun. 25, 2020

Related U.S. Application Data

(63) Continuation of application No. PCT/CN2018/104054, filed on Sep. 5, 2018.

(30) Foreign Application Priority Data

Sep. 5, 2017  (CN) .......................... 201710792438.1

(51) Int. Cl.
*G06F 3/06* (2006.01)
(52) U.S. Cl.
CPC .......... *G06F 3/0659* (2013.01); *G06F 3/0604* (2013.01); *G06F 3/0688* (2013.01)

(58) Field of Classification Search
CPC .... G06F 3/0604; G06F 3/0611; G06F 3/0658; G06F 3/0659; G06F 3/0674; G06F 3/0688; G06F 12/0246
See application file for complete search history.

(56) References Cited

U.S. PATENT DOCUMENTS

| 8,601,206 | B1 | 12/2013 | Shapiro |
| 2012/0054225 | A1 | 3/2012 | Marwah et al. |
| 2012/0066449 | A1 | 3/2012 | Colgrove et al. |

(Continued)

FOREIGN PATENT DOCUMENTS

| CN | 102298561 A | 12/2011 |
| CN | 102750257 A | 10/2012 |

(Continued)

OTHER PUBLICATIONS

"NVM Express over Fabrics," Revision 1.0, Jun. 5, 2016, 49 pages.
"NVM Express," Revision 1.3, May 1, 2017, 282 pages.

*Primary Examiner* — Larry T Mackall
(74) *Attorney, Agent, or Firm* — Conley Rose, P.C.

(57) ABSTRACT

A just a bunch of flash solid-state drive cluster (JBOF) and a method for transmitting a data processing request include obtaining a data processing request sent by a storage controller, determining a type of the data processing request, and either forwarding the data processing request to the target solid state drive (SSD) when the type of the data processing request is a bypass type, or sending the data processing request to a computing unit in the JBOF and sending the data processing request processed by the computing unit to the target SSD when the type of the data processing request is a background computing type.

20 Claims, 10 Drawing Sheets

(56) References Cited

U.S. PATENT DOCUMENTS

| | | | | |
|---|---|---|---|---|
| 2015/0095554 A1* | 4/2015 | Asnaashari | ......... | G06F 12/0246 |
| | | | | 711/103 |
| 2015/0319237 A1* | 11/2015 | Hussain | ................ | G06F 3/061 |
| | | | | 709/217 |
| 2017/0180477 A1 | 6/2017 | Hashimoto | | |
| 2019/0286595 A1 | 9/2019 | Worley et al. | | |

FOREIGN PATENT DOCUMENTS

| | | | |
|---|---|---|---|
| CN | 103370685 | A | 10/2013 |
| CN | 104298620 | A | 1/2015 |
| CN | 104991745 | A | 10/2015 |
| CN | 106126448 | A | 11/2016 |
| CN | 107728936 | A | 2/2018 |
| CN | 108733209 | A | 11/2018 |
| TW | I597665 | B | 9/2017 |
| WO | 03062979 | A2 | 7/2003 |
| WO | 2013027642 | A1 | 2/2013 |

\* cited by examiner

ENERGY MANAGEMENT METHOD AND APPARATUS FOR PROCESSING A REQUEST AT A SOLID STATE DRIVE CLUSTER

CROSS-REFERENCE TO RELATED APPLICATIONS

This application is a continuation application of International Patent Application No. PCT/CN2018/104054, filed on Sep. 5, 2018, which claims priority to Chinese Patent Application No. 201710792438.1, filed on Sep. 5, 2017. The disclosures of the aforementioned applications are hereby incorporated by reference in their entireties.

TECHNICAL FIELD

This application relates to the communications field, and more specifically, to a method and an apparatus for transmitting a data processing request.

BACKGROUND

Currently, an all flash array (AFA) usually includes a storage controller and a solid state drive (SSD) just bunch of flash SSD (JBOF). The storage controller is configured to execute a data processing request sent by a host. The data processing request may include an input/output (TO) request, an erasure code (EC) request, a garbage collection (GC) request, and the like. The storage controller may process to-be-processed data based on the data processing request, and save processed data into the JBOF, or send data read from the JBOF to the host as processed data.

Input/output operations per second (IOPS) of an SSD in the JBOF are relatively large, and TOPS and read/write performance per gigabyte (GB) of the JBOF are several times TOPS and read/write performance of a conventional hard disk drive (HDD).

However, as a demand for a client capacity grows unceasingly, a quantity of data processing requests that need to be simultaneously executed by the storage controller is increasing, but a processor in the storage controller has a limited computing capability, thereby limiting a quantity of data processing requests that can be simultaneously executed by the storage controller, reducing a speed of executing the data processing request by the storage controller, and increasing a delay of executing the data request by the storage controller.

SUMMARY

This application provides a method and an apparatus for transmitting a data processing request, to improve a speed of executing a data processing request by a storage controller, and reduce a delay of executing the data processing request by the storage controller.

According to a first aspect, a method for transmitting a data processing request is provided, and the method includes obtaining, by a solid-state drive cluster JBOF, a data processing request sent by a storage controller, where the data processing request is used to access a target solid-state drive SSD in the JBOF, determining, by the JBOF, a type of the data processing request, where the type of the data processing request includes a bypass type and a background computing type, and if the type of the data processing request is the bypass type, directly forwarding, by the JBOF, the data processing request to the target SSD, or if the type of the data processing request is the background computing type, sending, by the JBOF, the data processing request to a computing unit in the JBOF, and sending the data processing request processed by the computing unit to the target SSD.

In this embodiment of this application, data processing requests are classified into a bypass data processing request and a background computing data processing request. A computing resource occupied by a data processing manner indicated by the background computing data processing request may be no longer provided by a central processing unit (CPU) in the storage controller, and may be provided by the computing unit in the JBOF. To some extent, a computing resource used by the CPU in the storage controller to execute the background computing data processing request is released such that the CPU in the storage controller can simultaneously process more bypass data processing requests, thereby improving a speed of executing the data processing request by a bypass storage controller, and reducing a delay of executing the bypass data processing request by the storage controller.

Optionally, the data processing request is used to indicate a processing manner of data carried in the data processing request or data stored in the SSD. Further, the processing manner may include data reading/writing, an EC operation, a GC operation, and the like.

Optionally, the SSD may be a non-volatile memory express (NVMe) SSD, or may be a serial advanced technology attachment (SATA) SSD. This is not limited in this embodiment of this application.

Optionally, the data processing request may be a request encapsulated based on an interface protocol. For example, the data processing request may be an NVMe command encapsulated based on an NVMe over fabric (NVMeof) protocol and transmitted in a network.

With reference to the first aspect, in a possible implementation of the first aspect, the determining, by the JBOF, a type of the data processing request includes, if the data processing request comes from a bypass submission queue of the storage controller, determining, by the JBOF, that the type of the data processing request is the bypass type, or if the data processing request comes from a background computing submission queue of the storage controller, determining, by the JBOF, that the type of the data processing request is the background computing type.

The type of the data processing request is determined based on a type of a submission queue of the obtained data processing request. Compared with a solution in which the type is directly carried in the data processing request, overheads of transmitting the data processing request are reduced to some extent.

With reference to the first aspect, in a possible implementation of the first aspect, if the type of the data processing request is the bypass type, the directly forwarding, by the JBOF, the data processing request to the target SSD includes extracting, by the JBOF, the data processing request from a bypass submission queue of the JBOF, where the type of the data processing request is the bypass type, and directly forwarding, by the JBOF, the data processing request to the target SSD, or if the type of the data processing request is the background computing type, the sending, by the JBOF, the data processing request to the computing unit in the JBOF, and sending the data processing request processed by the computing unit to the target SSD includes extracting, by the JBOF, the data processing request from a background computing submission queue of the JBOF, where the type of the data processing request is the background computing type, and sending, by the JBOF, the data processing request to the computing unit in the JBOF, and sending the data processing request processed by the computing unit to the target SSD.

With reference to the first aspect, in a possible implementation of the first aspect, the determining, by the JBOF, a type of the data processing request includes, if the data processing request is a write request, determining, by the JBOF, that the type of the data processing request is the background computing type, or if the data processing request is a read request, determining, by the JBOF, that the type of the data processing request is the bypass type.

The type of the data processing request is directly determined based on whether the data processing request is a read request or a write request, to reduce a change in a format of a conventional data processing request or a format of a submission command queue, and to some extent, reduce costs in terms of software or hardware that are caused by the change. For example, a command queue initiator driver disposed in the storage controller may be not changed in this solution.

According to a second aspect, a method for transmitting a data processing request is provided, including receiving, by a storage controller, a data processing request, where the data processing request is used to access a target solid-state drive SSD in a solid-state drive cluster JBOF controlled by the storage controller, determining, by the storage controller, a type of the data processing request, where the type of the data processing request includes a bypass type and a background computing type, and if the type of the data processing request is the bypass type, processing, by the storage controller, the data processing request, and placing the processed data processing request in a bypass submission queue of the storage controller, or if the type of the data processing request is the background computing type, placing, by the storage controller, the data processing request in a background computing submission queue of the storage controller.

In this embodiment of this application, data processing requests are classified into a bypass data processing request and a background computing data processing request. A computing resource occupied by a data processing manner indicated by the background computing data processing request may be no longer provided by a CPU in the storage controller, and may be provided by the computing unit in the JBOF. To some extent, a computing resource used by the CPU in the storage controller to execute the background computing data processing request is released such that the CPU in the storage controller can simultaneously process more bypass data processing requests, thereby improving a speed of executing the data processing request by a bypass storage controller, and reducing a delay of executing the bypass data processing request by the storage controller.

Optionally, the data processing request may be a request encapsulated based on an interface protocol. For example, the data processing request may be an NVMe command encapsulated based on an NVMeof protocol and transmitted in a network.

Optionally, the obtaining a data processing request may include extracting the data processing request from a submission queue shared by the storage controller and a host.

Optionally, in an embodiment, the data processing request is a write request, and the type of the data processing request is the background computing type, or the data processing request is a read request, and the type of the data processing request is the bypass type.

The type of the data processing request is directly determined based on whether the data processing request is a read request or a write request, to reduce a change in a format of a conventional data processing request or a format of a submission command queue, and to some extent, reduce costs in terms of software or hardware that are caused by the change. For example, a command queue initiator driver disposed in the storage controller may be not changed in this solution.

According to a third aspect, an apparatus for transmitting a data processing request is provided, where the apparatus includes modules configured to perform the first aspect or any possible implementation of the first aspect.

According to a fourth aspect, an apparatus for transmitting a data processing request is provided, where the apparatus includes modules configured to perform the second aspect or any possible implementation of the second aspect.

According to a fifth aspect, an apparatus for transmitting a data processing request is provided, including a transceiver, a processor, and a memory. The processor is configured to control the transceiver to send and receive a signal, and the memory is configured to store a computer program. The processor is configured to invoke the computer program from the memory and run the computer program, to enable the apparatus to perform the method in the first aspect.

According to a sixth aspect, an apparatus for transmitting a data processing request is provided, including a transceiver, a processor, and a memory. The processor is configured to control the transceiver to send and receive a signal, and the memory is configured to store a computer program. The processor is configured to invoke the computer program from the memory and run the computer program, to enable the network device to perform the method in the second aspect.

According to a seventh aspect, a communications apparatus is provided. The communications apparatus may be an apparatus for transmitting a data processing request in the foregoing method designs, or may be a chip disposed in the apparatus for transmitting a data processing request. The communications apparatus includes a memory configured to store computer executable program code, a communications interface, and a processor. The processor is coupled to the memory and the communications interface. The program code stored in the memory includes an instruction. When the processor executes the instruction, the communications apparatus is enabled to perform the methods in the foregoing aspects.

According to an eighth aspect, a storage system is provided, where the storage system includes a storage device and a storage controller, the storage device includes the apparatus in the third aspect, and the storage controller includes the apparatus in the fourth aspect.

According to a ninth aspect, a computer program product is provided, where the computer program product includes computer program code. When the computer program code runs on a computer, the computer is enabled to perform the methods in the foregoing aspects.

According to a tenth aspect, a computer readable medium is provided, where the computer readable medium stores computer program code. When the computer program code runs on a computer, the computer is enabled to perform the methods in the foregoing aspects.

DESCRIPTION OF EMBODIMENTS

The following describes technical solutions of this application with reference to the accompanying drawings.

Figure 1:
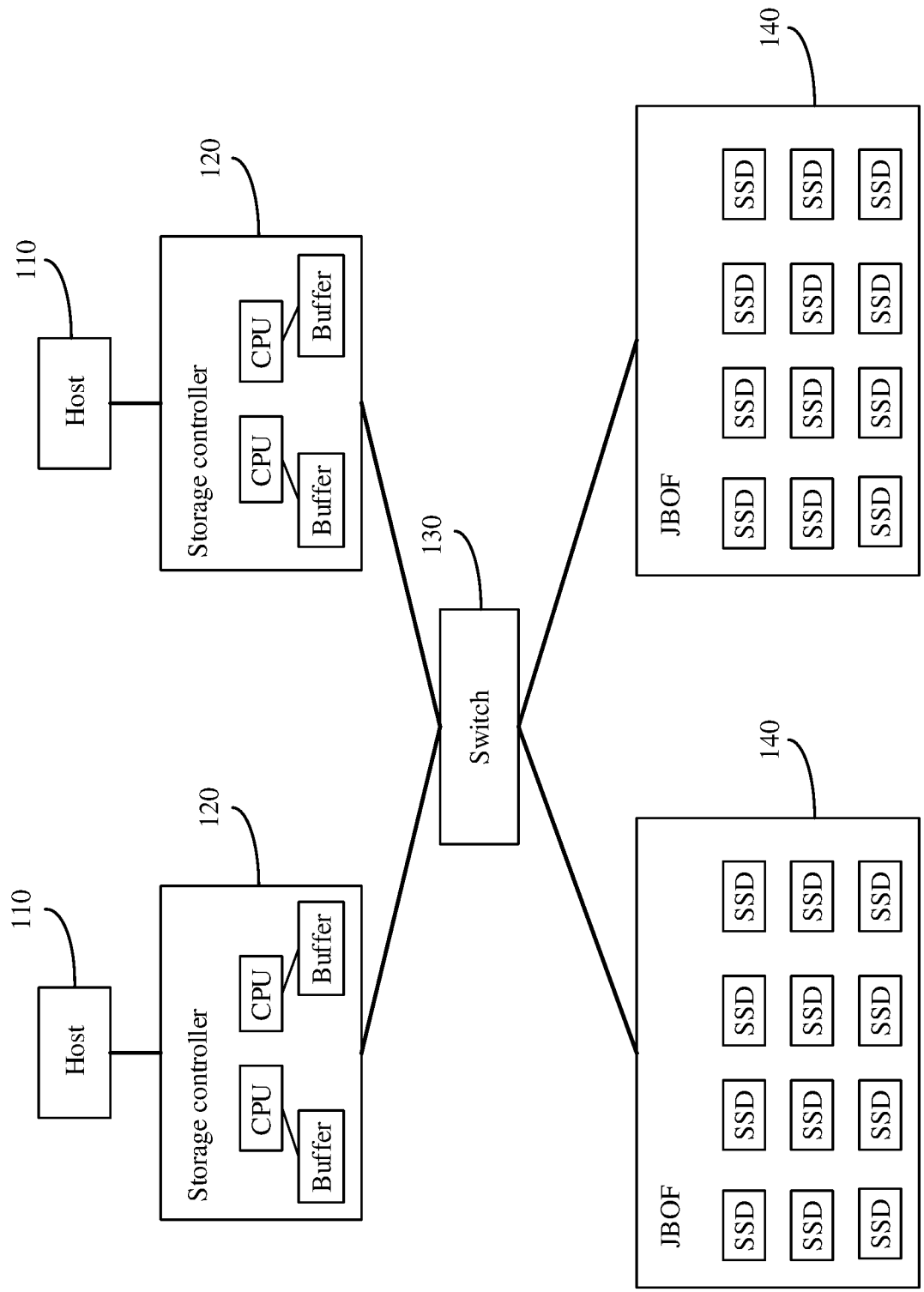
FIG. 1 is a schematic architectural diagram of an all-flash array according to an embodiment of this application.

FIG. 1 is a schematic diagram of a storage system based on an all-flash array. As shown in the figure, the storage system includes at least one host 110, at least one storage controller 120, a switch 130, and at least one JBOF 140. Each of the at least one host may be connected to the at least one storage controller, and the at least one storage controller may communicate with any one of the at least one JBOF using the switch. For example, the storage controller may access storage space of the JBOF, or process data in the storage space of the JBOF.

The host may apply for any one of the at least one JBOF as a target end. In other words, the host may access the target end by sending a data processing request, to read data from the target end, or write data into storage space of the target end.

Further, the data processing request may be an administration command or an IO request. The host may control the target end using the administration command, and may further access the storage space of the target end using the IO request.

For example, the target end may be an NVMe SSD. The host may control the NVMe SSD using an NVMe command, or may access the NVMe SSD using an IO request encapsulated into an NVMe command.

The storage controller (SC), also referred to as a storage processing controller (SPC), is configured to receive a data processing request sent by the host, and process data in the storage space of the target end based on the data processing request, or read data from the storage space of the target end, or write data in the data processing request into the target end. The storage controller includes at least one CPU (for example, a high-performance CPU with an X86 architecture) and at least one buffer. The CPU is configured to compute the data processing request, and the buffer may be configured to buffer data carried in the data processing request (for example, a write request).

It should be noted that the buffer may be a power backup memory buffer (PBMB) or a non-volatile memory (NVM). The PBMB is configured to buffer data.

The switch is configured to forward the data processing request in the storage controller to the JBOF, or is configured to aggregate the data carried in the data processing request and forward the data to the JBOF.

It should be understood that in different types of network architectures, the switch may be different types of switches that have a forwarding and sharing capability, for example, may be an Ethernet switch, an InfiniB and (IB) switch, or a peripheral component interconnect express (PCIe) switch. A specific type of the switch is not limited in this embodiment of this application.

The JBOF is a storage device with a plurality of SSDs installed on a baseplate. Logically, a plurality of physical SSDs is connected in series to provide relatively large storage space for data storage.

Based on the storage system described above, a process of processing an IO request when the data processing request is an IO request is described below with reference to FIG. 2 and FIG. 3.

Figure 2:
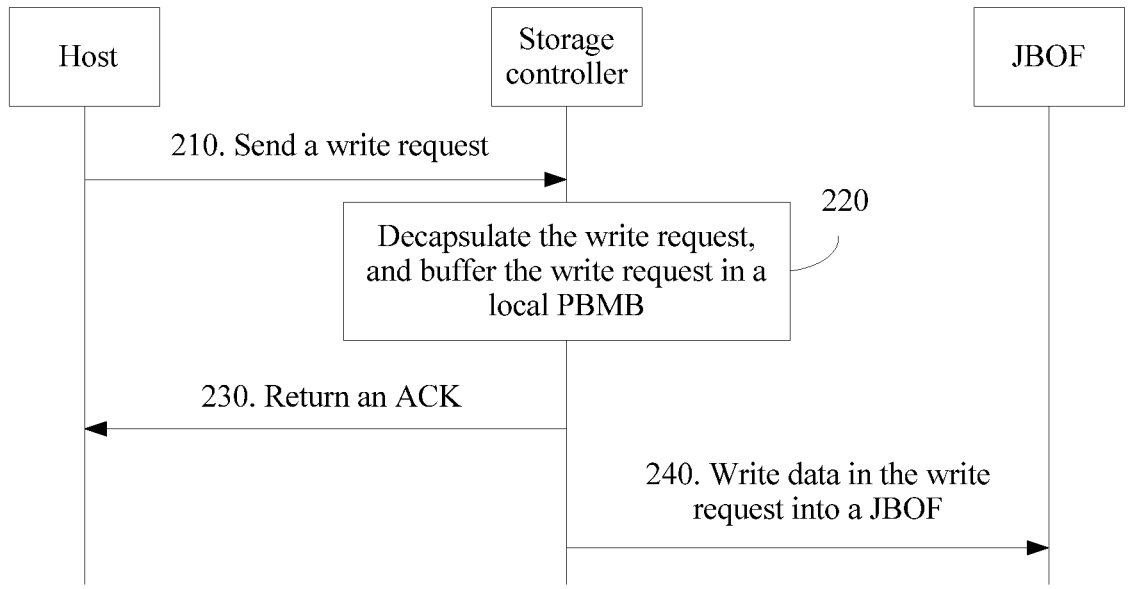
FIG. 2 is a schematic flowchart of a method for writing data into a JBOF by an AFA-based storage system.

FIG. 2 is a schematic flowchart of a method for writing data into a JBOF by an AFA-based storage system. The method shown in FIG. 2 includes the following steps.

210. A host sends a write request to a storage controller.

Further, an implementation of step 210 may be that the host saves, into a submission queue of the storage controller in a remote direct memory access (RDMA) manner, the write request encapsulated into an NVMe command such that the storage controller can extract the write request from the submission queue.

220. The storage controller decapsulates the write request, and buffers the write request in a local PBMB.

230. The storage controller returns an acknowledgement (ACK) to the host to indicate completion of an operation of the write request.

Further, the storage controller may encapsulate the ACK into an NVMe command, and save the encapsulated command into a completion queue of the storage controller such that the host obtains the ACK from the completion queue to determine that the operation of the write request succeeds.

It should be noted that, for the host, after the storage controller returns the ACK for a service request, the host may consider that an operation procedure of the write request ends. Subsequent operations, for example, the storage controller processes data in the write request and saves the processed data into storage space of the JBOF, are invisible to the host, in other words, the host does not care about a subsequent operation performed by the storage controller after returning the ACK.

240. The storage controller writes the data in the write request into the JBOF using a switch.

Figure 3:
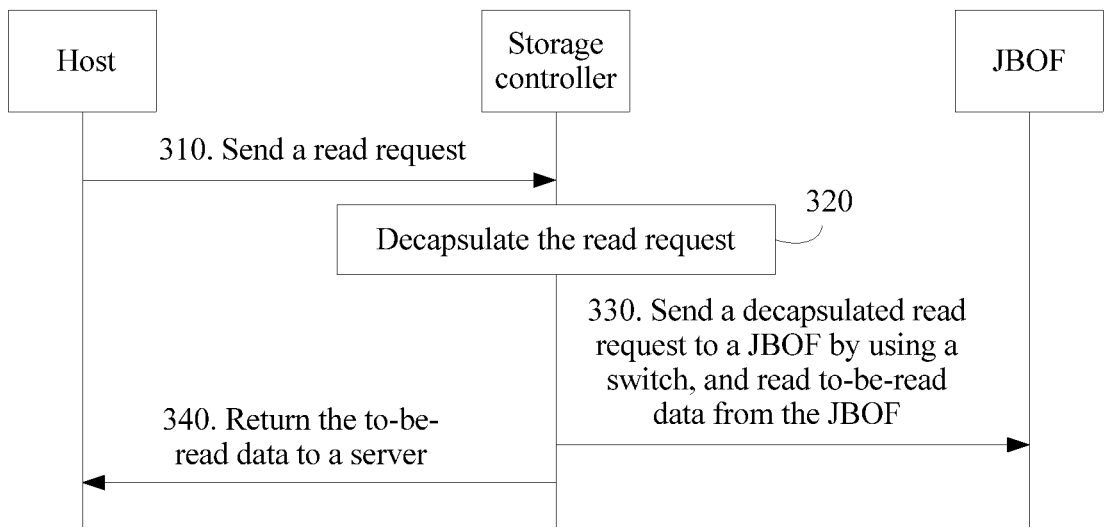
FIG. 3 is a schematic flowchart of a method for reading data from a JBOF by an AFA-based storage system.

FIG. 3 is a schematic flowchart of a method for reading data from a JBOF by an AFA-based storage system. The method shown in FIG. 3 includes the following steps.

310. A host sends a read request to a storage controller.

Further, the host saves, into a submission queue of the host, the read request encapsulated into an NVMe command, and saves the read request into a submission queue of the storage controller in an RDMA manner such that the storage controller extracts the read request from the submission queue of the storage controller.

320. The storage controller decapsulates the read request.

Further, the storage controller decapsulates the read request extracted from the submission queue, to generate a read request that can be directly processed by an SSD in the JBOF.

330. The storage controller sends a decapsulated read request to the JBOF using a switch, and reads to-be-read data from the JBOF.

340. The storage controller returns the to-be-read data to the host.

In other approaches, computing processes required by the foregoing write process and the foregoing read process, and computing required by another data processing process need to occupy computing resources of a CPU in the storage controller. However, as a demand for a client capacity grows unceasingly, a quantity of data processing requests that need to be simultaneously executed in the storage controller is increasing, and even if the SSD in the JBOF has high TOPS performance and can meet a current demand for the client capacity, a processor in the storage controller cannot simultaneously provide enough computing resources for a large quantity of data processing requests. Consequently, a quantity of IO requests that can be simultaneously sent to the JBOF is limited, and a quantity of IO requests processed per second by the SSD may fail to be met. In other words, a current computing capability of the processor in the storage controller cannot meet the demand for the client capacity, and further limits the performance of the SSD in the JBOF to some extent.

However, it can be learned from the data read/write process in the AFA-based storage system described above that, when the host writes data into the JBOF, and after the storage controller writes data into the PBMB, the host may obtain an I/O write success returned by the storage controller. In this case, the host may consider that the write process ends, and the host does not care about a subsequent process of writing data into the JBOF by the storage controller. In the data read process, because data needs to be read from the JBOF during each time reading, a path required by the host to obtain data is longer than a path used by the host to write data. To be specific, because the path for reading data is relatively long, the host waits for a relatively long time. A read request is relatively sensitive to a delay and is a delay-sensitive data processing request. In the data write process, the host needs to wait for a relatively short time, and a write request may be understood as a delay-insensitive data processing request.

To resolve a problem that the storage controller has limited resources, in this embodiment of this application, data processing requests are classified into a delay-sensitive data processing request and a delay-insensitive data processing request based on transmission delay requirements of the data processing requests. Based on transmission delay requirements of the two types of data processing requests, a method and an apparatus for transmitting a data processing request are provided. The delay-sensitive data processing request may be a data processing request with a relatively high transmission delay requirement, and the delay-insensitive data processing request may be a data processing request with a relatively low transmission delay requirement.

Figure 4:
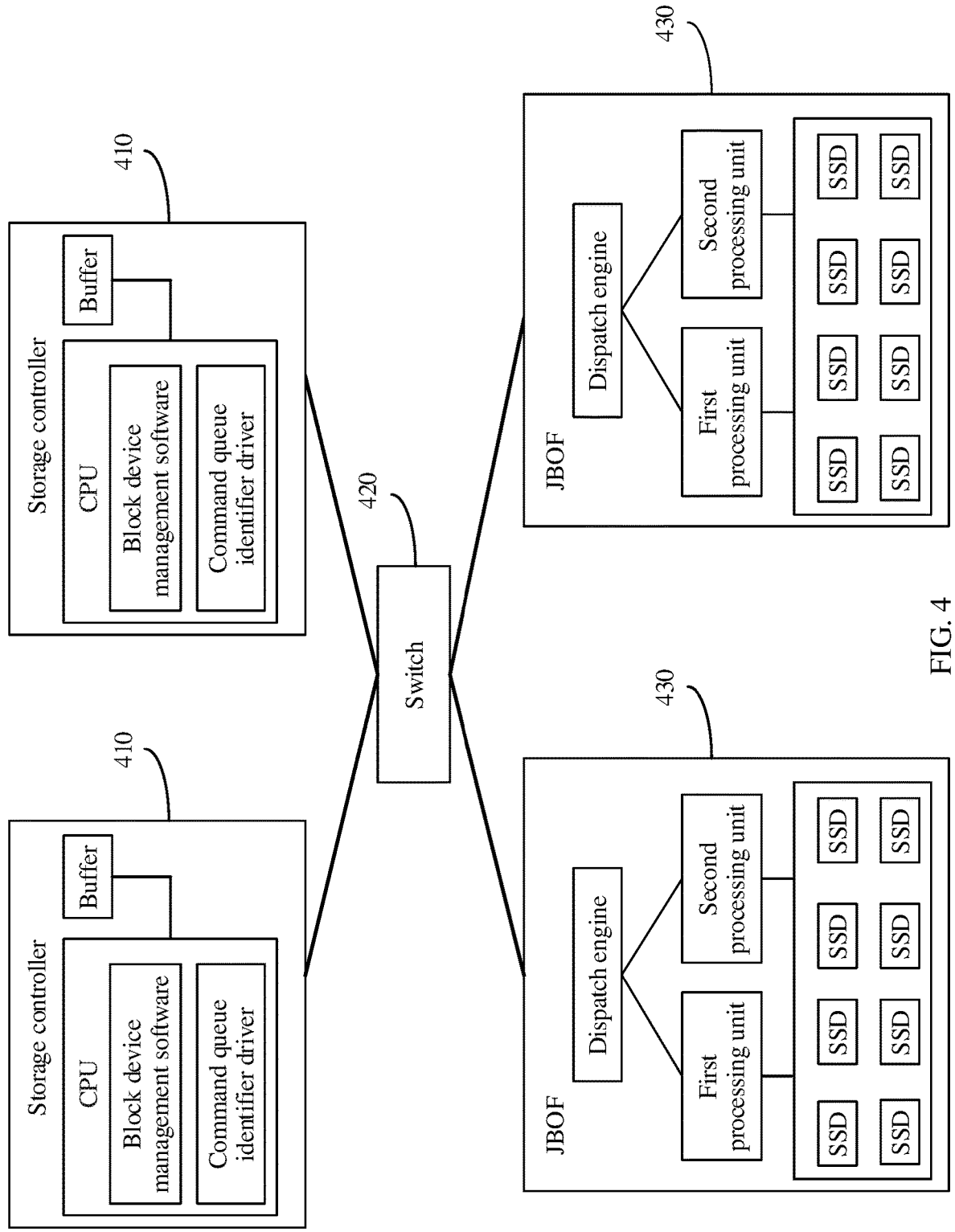
FIG. 4 is a schematic block diagram of an AFA-based storage system according to an embodiment of this application.

To facilitate understanding of the embodiments of this application, an AFA-based storage system applicable to the embodiments of this application is first briefly described. FIG. 4 is a schematic block diagram of an AFA-based storage system according to an embodiment of this application. It should be understood that the AFA storage system shown in FIG. 4 may be an architecture improved from the AFA storage system shown in FIG. 1, and main improvements are made to structures of the storage controller and the JBOF in the AFA storage system. For brevity, the storage controller and the JBOF are mainly described below. For another unit related to the AFA storage system, refer to the foregoing descriptions.

The AFA storage system shown in FIG. 4 includes at least one storage controller 410, a switch 420, and at least one JBOF 430. The storage controller includes a command queue initiator driver and block device management software, and each of the at least one JBOF includes a dispatch engine, a first processing unit, and a second processing unit.

The command queue initiator driver unit in the storage controller is configured to create a submission queue of the storage controller. The submission queue is used to transmit a data processing request from the storage controller to the JBOF, and the submission queue may include a plurality of types, for example, a delay-sensitive type and a delay-insensitive type. Different types of submission queues are used to store different types of data processing requests. For example, a delay-insensitive submission queue is used to store a delay-insensitive data processing request, and a delay-sensitive submission queue is used to store a delay-sensitive data processing request.

The command queue initiator driver unit is further configured to determine whether a type of the data processing request is a delay-sensitive type or a delay-insensitive type.

It should be noted that, to transmit the data processing request from the storage controller to a submission queue of the JBOF, the JBOF further needs to create, in the JBOF, a submission queue corresponding to the submission queue of the storage controller. To be specific, the submission queue of the storage controller and the submission queue of the JBOF logically constitute a submission queue used to transmit the data processing request from the storage controller to the JBOF. The submission queue of the storage controller may occupy a storage resource in a memory of the storage controller, and the submission queue of the JBOF may occupy storage space in a buffer in the JBOF.

The JBOF may further include a unit for creating a submission queue, and different types of submission queues are created in a same manner in which the storage controller creates a submission queue.

The command queue initiator driver unit may be further configured to create a completion queue, and the completion queue is used to store a feedback result for a completed data processing request. The command queue driver unit may be further configured to create different types of completion queues for feedback results for different types of data processing requests. For example, a delay-insensitive completion queue is used to store a feedback for the delay-insensitive data processing request, and a delay-sensitive completion queue is used to store a feedback for the delay-sensitive data processing request.

Storage space management software in the storage controller is configured to convert a data processing request received from a host into a data processing request that can be directly processed by the JBOF. For example, when the storage space management software may be block device management software, the block device management software may translate a storage address in the data processing request received from the host into a storage address that includes a storage block such that the JBOF can directly process the data processing request.

It should be understood that the storage space management software may be block device management software or character device management software, and this is not limited in this embodiment of this application.

The dispatch engine in the JBOF is configured to send, based on the type that is of the data processing request and that is determined by the command queue initiator driver unit, different types of data processing requests to processing units configured to process different types of data processing requests. To be specific, the dispatch engine may send the delay-sensitive data processing request to the first processing unit, and send the delay-insensitive data processing request to the second processing unit.

It should be understood that the dispatch engine may be implemented by a field programmable gate array (FPGA) or an application specific integrated circuit (ASIC), or may be implemented by software.

It should be further understood that the dispatch engine further includes a port connected to the switch, for example, an Ethernet network interface that supports an RDMA, and is configured to receive, using the switch, a data processing request sent by the command queue initiator driver unit.

The first processing unit is configured to process the delay-sensitive data processing request and/or a hardware offloading data processing request.

Further, the hardware offloading data processing request may be understood as a data processing request that does not need to be processed by hardware in the storage controller. A hardware processing process required by the data processing request may be implemented by hardware in the first processing unit. In other words, the hardware offloading data processing request may be a data processing request for offloading a hardware processing process in the storage controller.

If the data processing request is a delay-sensitive data processing request, the first processing unit may directly forward the data processing request to the JBOF. If the data processing request is a hardware offloading data processing request, the first processing unit may convert, using processing performance of the first processing unit, the delay-sensitive data processing request into a data processing request that can be directly processed by the JBOF. For example, when the first processing unit is an FPGA, the first processing unit may convert, using advantages of a low delay and hardware processing of the FPGA, the delay-sensitive data processing unit into the data processing request that can be directly processed by the JBOF, and then return a result to the storage controller.

From another aspect, the delay-sensitive data processing request may be alternatively a data processing request that can be directly processed by the JBOF, and the hardware offloading data processing request may be alternatively a data processing request that cannot be directly processed by the JBOF.

It should be understood that the first processing unit may be implemented by a FPGA or an ASIC designed for a specific purpose.

It should be noted that if the delay-sensitive data processing request received by the first processing unit can be directly processed by an SSD in the JBOF, the first processing unit may directly forward the delay-sensitive data processing request to the JBOF. In other words, the first processing unit may transparently transmit the delay-sensitive data processing request to the JBOF, and the JBOF executes the delay-sensitive data processing request.

It should be further understood that the first processing unit and the dispatch engine may be integrated into one physical component, or may be separately disposed in two different physical components. This is not limited in this embodiment of this application.

The second processing unit is configured to process the delay-insensitive data processing request, and may process, in a data processing manner indicated by the data processing request, data carried in the data processing request, or process, in a data processing method indicated by the data processing request, data stored in the storage space of the JBOF. For example, the second processing unit performs EC computing on the data carried in the data processing request, or performs a GC operation on the storage space of the JBOF.

It should be understood that the second processing unit may include at least one low-cost CPU (or low-performance CPU). For example, the CPU may be an advanced reduced instruction set computer machines (ARM) core or a microprocessor without interlocked piped stages (MIPS) core.

A low-cost CPU is disposed in the JBOF as the second processing unit, to help a CPU in a storage processing control unit process the second processing unit such that pressure on the CPU in the storage processing control unit is reduced, and costs required for improving an architecture of the JBOF are also reduced to some extent.

It may be learned that, compared with the JBOF in FIG. 3, the JBOF in FIG. 4 is added with functions such as offloading data processing requests based on types of the data processing requests and a computing process required for executing the delay-insensitive data processing request, which are more intelligent than functions of the JBOF in FIG. 3. Therefore, the JBOF in FIG. 4 is also referred to as an intelligent JBOF. In other words, the following JBOF that has the functions such as offloading data processing requests based on types of the data processing requests and the computing process required for executing the delay-insensitive data processing request may be referred to as an iBOF.

It should be understood that functional units in the JBOF may be integrated in one system on chip (SoC), and the SoC may include one CPU that may be used as the second processing unit, or may include one FPGA or ASIC that may be used as the dispatch engine and the first processing unit. The JBOF may be alternatively implemented by detached hardware. To be specific, the CPU used as the second processing unit and the FPGA or ASIC used as the dispatch engine and the first processing unit are two pieces of independent hardware.

It should be further understood that FIG. 1 and FIG. 4 show only one possible AFA storage system. The embodiments of this application may further be applicable to another AFA storage system. It should be understood that for brevity, for a function of each unit in the following AFA storage system, refer to the foregoing descriptions.

Figure 5:
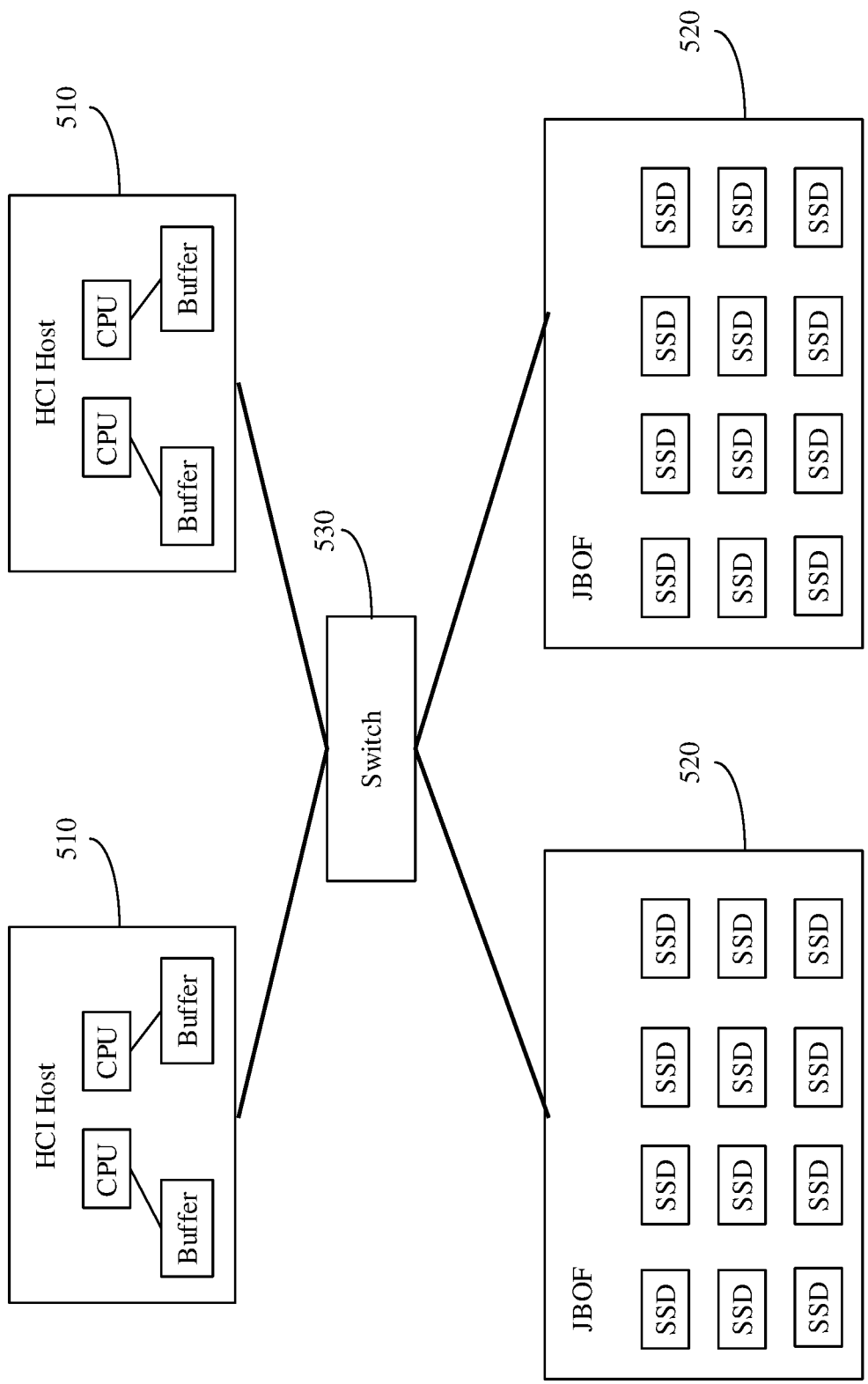
FIG. 5 is a schematic block diagram of an AFA-based storage system based on a hyper-converged technology according to another embodiment of this application.

For example, FIG. 5 is a schematic block diagram of an AFA storage system based on a hyper-converged technology according to another embodiment of this application. The AFA storage system based on the hyper-converged (HCI) technology shown in FIG. 5 includes at least one HCI host 510, at least one JBOF 520, and a switch 530.

The HCI host 510 may be understood as a mixture of a host and an SPC, in other words, a new host formed when the host and the SPC are deployed together in a hyper-converged form. It should be understood that the HCI host 510 only changes a deploying manner between the host and the SPC, but each function that can be originally implemented by the host and the SPC described above may still be implemented.

The JBOF 520 is the intelligent JBOF mentioned above, and the JBOF may be connected to the HCI host using the switch.

Optionally, the JBOF and the HCI host may be alternatively directly connected using a communications cable (for example, a bus) without using the switch. A specific connection manner between the JBOF and the HCI host is not limited in this embodiment of this application.

Figure 6:
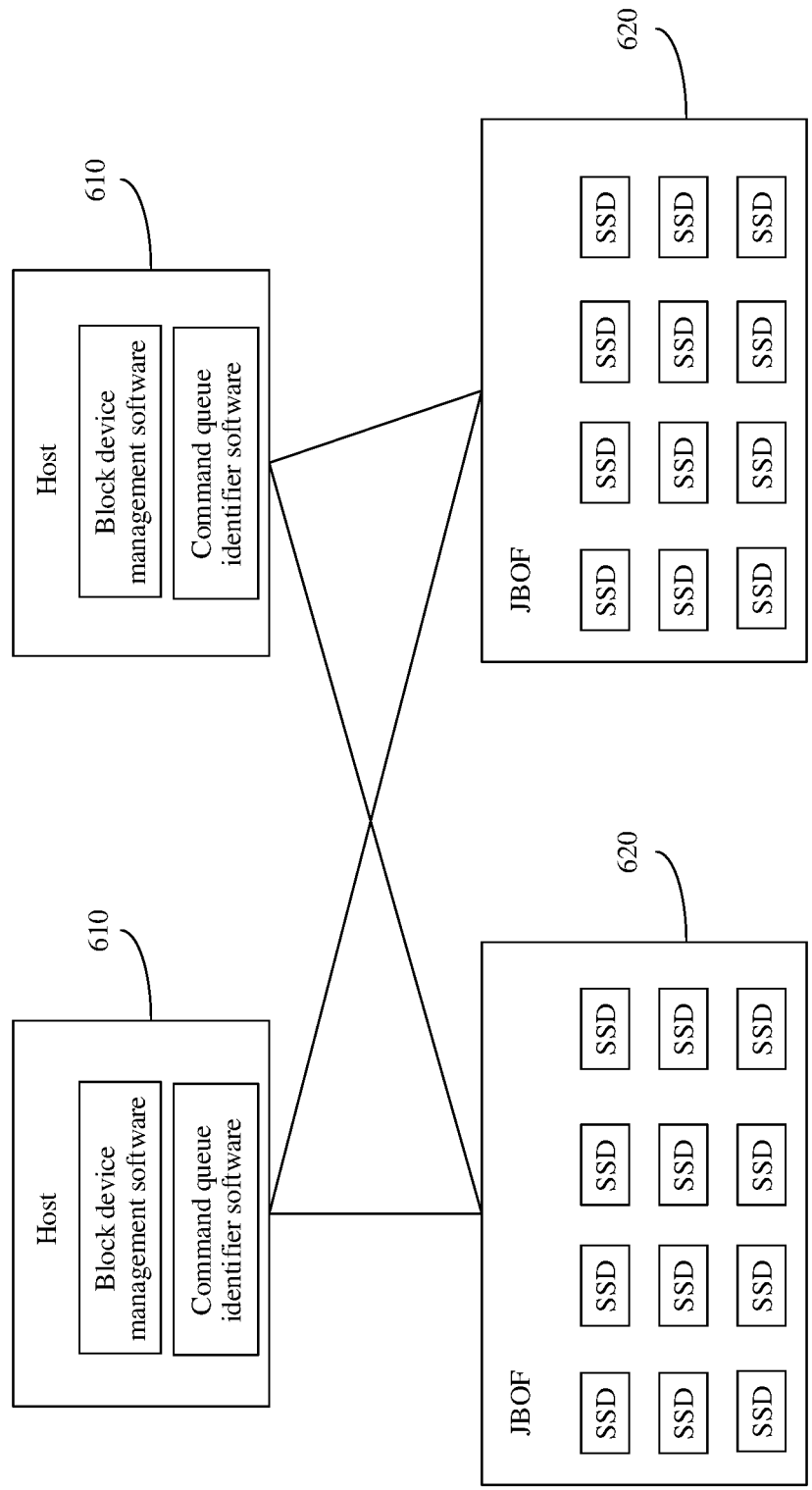
FIG. 6 is a schematic block diagram of an AFA-based storage system according to another embodiment of this application.

For another example, FIG. 6 is a schematic block diagram of an AFA storage system according to another embodiment of this application. The AFA storage system shown in FIG. 6 includes at least one host 610 and at least one JBOF 620.

The host 610 includes all function modules in the foregoing storage controller, for example, the command queue initiator driver, and may implement functions of the storage controller in addition to original functions of the host. The host is located in a different unit device from the JBOF, and the host and the JBOF may be directly connected using a communications cable (for example, a bus) without using the switch.

Optionally, the JBOF and the host may be alternatively connected using the switch. A specific connection manner between the JBOF and the HCI host is not limited in this embodiment of this application.

It should be noted that in the foregoing description, data processing requests are classified into a delay-sensitive data processing request and a delay-insensitive data processing request only from a perspective of transmission delays of the data processing requests. In this embodiment of this application, the data processing requests may be further classified into a bypass type and a background computing type based on manners of processing the data processing requests by the JBOF. A bypass data processing request may be understood as a data processing request that does not need to be processed by a computing unit of the JBOF, and a background computing data processing request is a data processing request that needs to be processed by the computing unit of the JBOF. In other words, the delay-sensitive data processing request and the hardware offloading data processing request may be bypass data processing requests, and the delay-insensitive data processing request may be a background computing data processing request. Correspondingly, the first processing unit may also be referred to as a hardware bypass engine, and the second processing unit may also be referred to as a background software processor.

A method for transmitting a data processing request in an embodiment of this application is described below with reference to any AFA storage system in the foregoing descriptions using a manner in which the JBOF classifies data processing requests based on processing manners of the data processing requests as an example.

Figure 7:
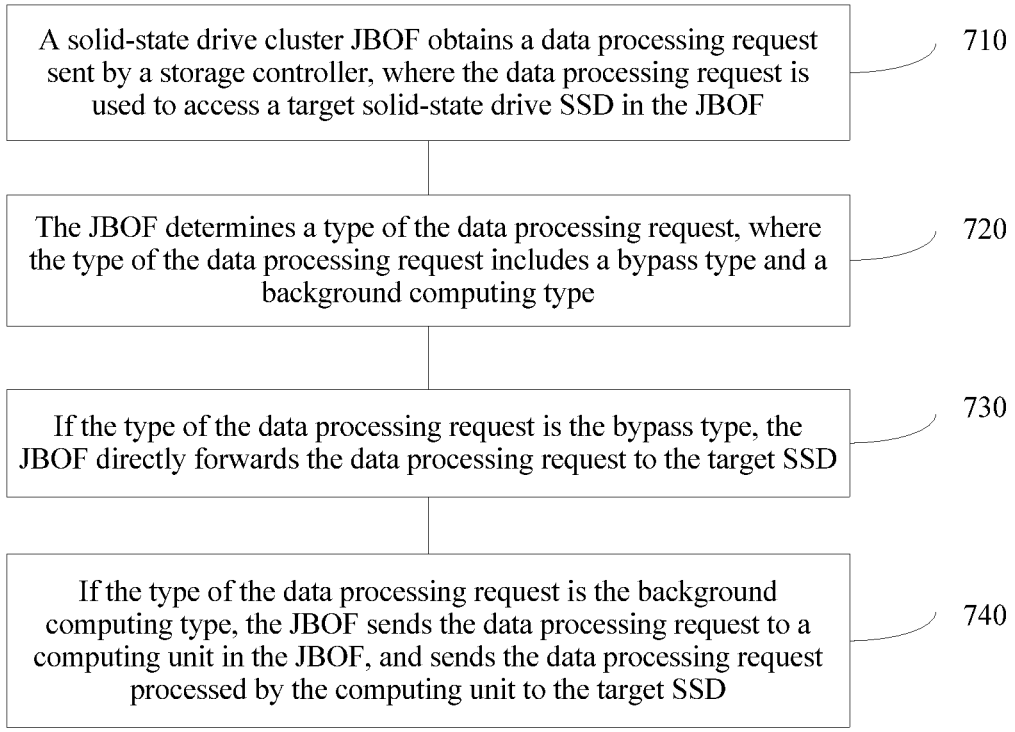
FIG. 7 is a schematic flowchart of a method for transmitting a data processing request according to an embodiment of this application.

FIG. 7 is a schematic flowchart of a method for transmitting a data processing request according to an embodiment of this application. The method shown in FIG. 7 includes the following steps.

710. A solid-state drive cluster JBOF obtains a data processing request sent by a storage controller, where the data processing request is used to access a target solid-state drive SSD in the JBOF.

Further, that the data processing request is used to access the target SSD in the JBOF may be understood as processing data in the target SSD in a data processing manner indicated by the data processing request, or storing the processed data into the target SSD in a data processing manner indicated by the data processing request.

The data processing manner indicated by the data processing request may include data reading/writing, an EC operation, a GC operation, and the like.

It should be understood that the storage controller may be any device that has a function of the storage controller, for example, may be the storage controller in FIG. 4, may be the HCI host in FIG. 5, or may be the host in FIG. 6. A specific embodiment of the storage controller is not limited in this embodiment of this application.

It should be further understood that the SSD may be an NVMe SSD, or may be a SATA SSD. This is not limited in this embodiment of this application.

Optionally, the data processing request may be a request encapsulated based on an interface protocol. For example, the data processing request may be an NVMe command encapsulated based on an NVMeof protocol and transmitted in a network.

Optionally, the obtaining a data processing request may include extracting the data processing request from a submission queue shared by the storage controller and the JBOF.

720. The JBOF determines a type of the data processing request, where the type of the data processing request includes a bypass type and a background computing type.

Further, the bypass data processing request is a data processing request that does not need to be processed by a software computing unit of the JBOF, or a data processing request that needs to be processed by hardware of the JBOF, or a computing resource required for processing the bypass data processing request may be provided by a computing unit (for example, a high-performance CPU in the storage controller) in the storage controller.

The background computing data processing request is a data processing request that needs to be processed by the computing unit of the JBOF, or a computing resource required for processing the background computing data processing request may be provided by a computing unit (for example, a low-performance CPU) in the JBOF.

Optionally, in an embodiment, step 720 includes, if the data processing request comes from a bypass submission queue of the storage controller, the JBOF determines that the type of the data processing request is the bypass type, or if the data processing request comes from a background computing submission queue of the storage controller, the JBOF determines that the type of the data processing request is the background computing type.

Optionally, in an embodiment, step 720 includes if the data processing request is a write request, the JBOF determines that the type of the data processing request is the background computing type, or if the data processing request is a read request, the JBOF determines that the type of the data processing request is the bypass type.

Further, the type of the data processing request may further be directly determined based on a data processing manner indicated by the data processing request. For example, a write request is a delay-insensitive data processing request, and may be classified into a background computing data processing request, and a read request is a delay-sensitive data processing request, and may be classified into a bypass data processing request.

The type of the data processing request is directly determined based on whether the data processing request is a read request or a write request, to reduce a change in a format of a conventional data processing request or a format of a submission command queue, and to some extent, reduce costs in terms of software or hardware that are caused by the change. For example, a command queue initiator driver disposed in the storage controller may be not changed in this solution, and the data processing request is sent, in a conventional manner for transmitting a data processing request, to a dispatch engine in the JBOF for offloading.

It should be noted that the foregoing solution in which no command queue initiator driver is disposed in the storage controller is applicable to a solution in which a data processing request includes only a write request and a read request.

730. If the type of the data processing request is the bypass type, the JBOF directly forwards the data processing request to the target SSD.

It should be noted that a computing process required by the bypass data processing request may be executed by a CPU in the storage controller, in other words, the SSD in the JBOF may be directly accessed using the bypass data processing request.

For example, when the bypass data processing request is a read request, a computing process required for determining a storage address in which data to be read by the read request is located may be computed by the CPU in the storage controller. The JBOF may directly read the data from the storage address determined by the CPU in the storage controller.

In this embodiment of this application, data processing requests are classified into a bypass data processing request and a background computing data processing request. A computing resource occupied by a data processing manner indicated by the background computing data processing request may be no longer provided by the CPU in the storage controller, and may be provided by the computing unit in the JBOF. To some extent, a computing resource used by the CPU in the storage controller to execute the background computing data processing request is released such that the CPU in the storage controller can simultaneously process more bypass data processing requests, thereby improving a speed of executing the data processing request by a bypass storage controller, and reducing a delay of executing the bypass data processing request by the storage controller.

Optionally, in an embodiment, step 730 includes the JBOF extracts the data processing request from a bypass submission queue of the JBOF, where the type of the data processing request is the bypass type, and the JBOF directly forwards the data processing request to the target SSD.

It should be noted that the bypass submission queue of the JBOF and the bypass submission queue of the storage controller jointly transmit the data processing request from the storage controller to the JBOF. Further, the storage controller may save the bypass data processing request into the bypass submission queue of the storage controller, and then save the bypass data processing request in the bypass submission queue of the storage controller into the bypass submission queue of the JBOF through a network, to transmit the bypass data processing request from the storage controller to the JBOF. Logically, the bypass submission queue of the JBOF and the bypass submission queue of the storage controller jointly form a bypass submission queue, to transmit the bypass data processing request from the storage controller to the JBOF.

It should further be understood that the bypass submission queue of the JBOF and the bypass submission queue of the storage controller that jointly form a bypass submission queue correspond to each other. In other words, the JBOF may determine, based on indication information of the bypass submission queue of the storage controller in which a received bypass data processing request is located, the bypass submission queue of the JBOF into which the bypass data processing request is saved.

Optionally, in an embodiment, the method further includes if the type of the data processing request is a hardware offloading data processing request in the bypass type, a hardware processing unit in the JBOF processes the hardware offloading data processing request, and sends the processed hardware offloading data processing request to the target SSD.

740. If the type of the data processing request is the background computing type, the JBOF sends the data processing request to the computing unit in the JBOF, and sends the data processing request processed by the computing unit to the target SSD.

It should be noted that the computing unit in the JBOF may be any apparatus that has a computing function in the JBOF, for example, the second processing unit.

For example, when the data processing request is an EC request, n pieces of raw data obtained from the storage controller may be encoded using a computing unit CPU disposed in the JBOF, to finally obtain n+m pieces of data, where n and m are positive integers. The computing unit in the JBOF writes the finally obtained n+m pieces of data into the SSD in the JBOF using a write request.

It should further be understood that, when the n+m pieces of data are written into the SSD in the JBOF using the write request, a disk selection operation that needs to be performed may also be performed by the computing unit in the JBOF, or may be performed by the CPU in the storage controller, or may be performed by another apparatus that may have a disk selection function. This is not limited in this embodiment of this application. In other words, the computing unit in the JBOF may provide a computing resource only for computing (for example, an EC operation) at a data level, and may further provide a computing resource for computing (for example, a disk selection operation) at a data management level.

For another example, when the data processing request is a GC request, a data read/write operation, computing, and a block erasure operation in the SSD that are required for performing a GC operation may be performed by the computing unit in the JBOF.

Optionally, in an embodiment, step 740 includes the JBOF extracts the data processing request from a background computing submission queue of the JBOF, where the type of the data processing request is the background computing type, and the JBOF sends the data processing request to the computing unit in the JBOF, and sends the data processing request processed by the computing unit to the target SSD.

It should be noted that the background computing submission queue of the JBOF and the background computing submission queue of the storage controller jointly transmit the background computing data processing request from the storage controller to the JBOF. Further, the storage controller may save the background computing data processing request into the background computing submission queue of the storage controller, and then save the background computing data processing request in the background computing submission queue of the storage controller into the background computing submission queue of the JBOF through a network, to transmit the background computing data processing request from the storage controller to the JBOF. Logically, the background computing submission queue of the JBOF and the background computing submission queue of the storage controller jointly form a background computing submission queue, to transmit the background computing data processing request from the storage controller to the JBOF.

It should further be understood that the background computing submission queue of the JBOF and the background computing submission queue of the storage controller that jointly form a background computing submission queue correspond to each other. In other words, the JBOF may determine, based on indication information of the background computing submission queue of the storage controller in which a received background computing data processing request is located, the background computing submission queue of the JBOF into which the background computing data processing request is saved.

Figure 8:
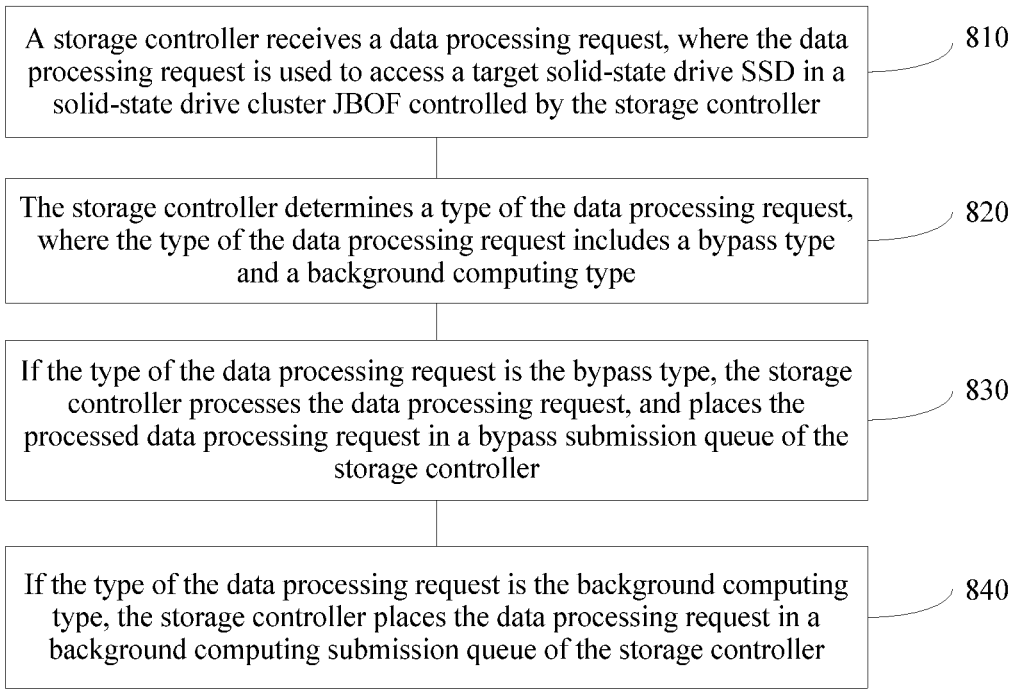
FIG. 8 is a schematic flowchart of a method for transmitting a data processing request according to an embodiment of this application.

FIG. 8 is a schematic flowchart of a method for transmitting a data processing request according to an embodiment of this application. The method shown in FIG. 8 includes the following steps.

810. A storage controller receives a data processing request, where the data processing request is used to access a target solid-state drive SSD in a solid-state drive cluster JBOF controlled by the storage controller.

Optionally, the data processing request may be a request encapsulated based on an interface protocol. For example, the data processing request may be an NVMe command encapsulated based on an NVMeof protocol and transmitted in a network.

Optionally, the obtaining a data processing request may include extracting the data processing request from a submission queue shared by the storage controller and a host.

It should be noted that the submission queue shared by the storage controller and the host may include a submission queue of the storage controller and a submission queue of the host. In other words, the submission queue shared by the storage controller and the host is a logical concept, and the submission queue of the storage controller and the submission queue of the host are physical concepts. The submission queue shared by the storage controller and the host is used to transmit the data processing request that needs to be executed by the storage controller from a host end to a storage controller end.

820. The storage controller determines a type of the data processing request, where the type of the data processing request includes a bypass type and a background computing type.

Optionally, the storage controller determines the type of the data processing request according to a preset rule, and the preset rule is used to indicate types corresponding to different data processing requests.

It should be noted that the different data processing requests may be data processing requests that indicate different data processing manners, for example, a read request and a write request. The different data processing requests may further indicate data processing requests sent by different hosts, for example, data processing requests sent by hosts with different priorities may belong to different types. This is not limited in this embodiment of this application.

830. If the type of the data processing request is the bypass type, the storage controller processes the data processing request, and places the processed data processing request in a bypass submission queue of the storage controller.

840. If the type of the data processing request is the background computing type, the storage controller places the data processing request in a background computing submission queue of the storage controller.

Further, a type of a submission queue is used to indicate the type of the data processing request, and it may be understood that the type of the submission queue corresponds to the type of the data processing request. The type of the submission queue includes a bypass submission queue and a background computing submission queue. A data processing request stored in the bypass submission queue may be a bypass data processing request, and a data processing request stored in the background computing submission queue may be a background computing data processing request.

It should be noted that the submission queue of the storage controller may be created by the storage controller. The storage controller may add indication information to a submission queue creation command, and the indication information is used to indicate a type of the submission queue. After receiving the submission queue creation command, the JBOF may determine the type of the created submission queue based on the indication information in the submission queue creation command.

In this embodiment of this application, data processing requests are classified into a bypass data processing request and a background computing data processing request. A computing resource occupied by a data processing manner indicated by the background computing data processing request may be no longer provided by a CPU in the storage controller, and may be provided by a computing unit in the JBOF. To some extent, a computing resource used by the CPU in the storage controller to execute the background computing data processing request is released such that the CPU in the storage controller can simultaneously process more bypass data processing requests, thereby improving a speed of executing the data processing request by a bypass storage controller, and reducing a delay of executing the bypass data processing request by the storage controller.

Optionally, in an embodiment, the method further includes if the type of the data processing request is a read request, the storage controller determines a storage address, in the JBOF, of data to be read by the read request.

Based on the AFA-based storage system shown in FIG. 4, a method for transmitting a data processing request in an embodiment of this application is described in detail below with reference to FIG. 9 and FIG. 10 using an example in which the data processing request is encapsulated into an NVMe command for transmission.

Figure 9:
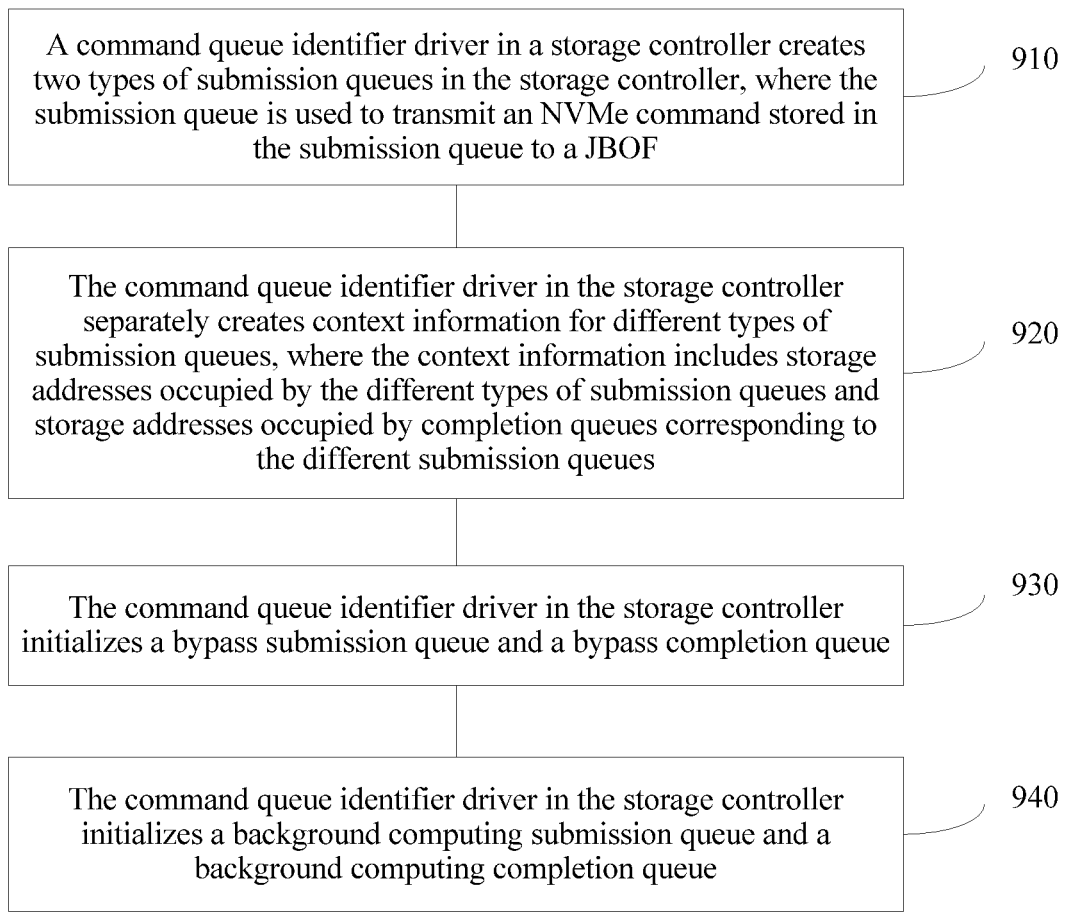
FIG. 9 is a schematic flowchart of a method for transmitting an NVMe command according to an embodiment of this application.
Figure 10:
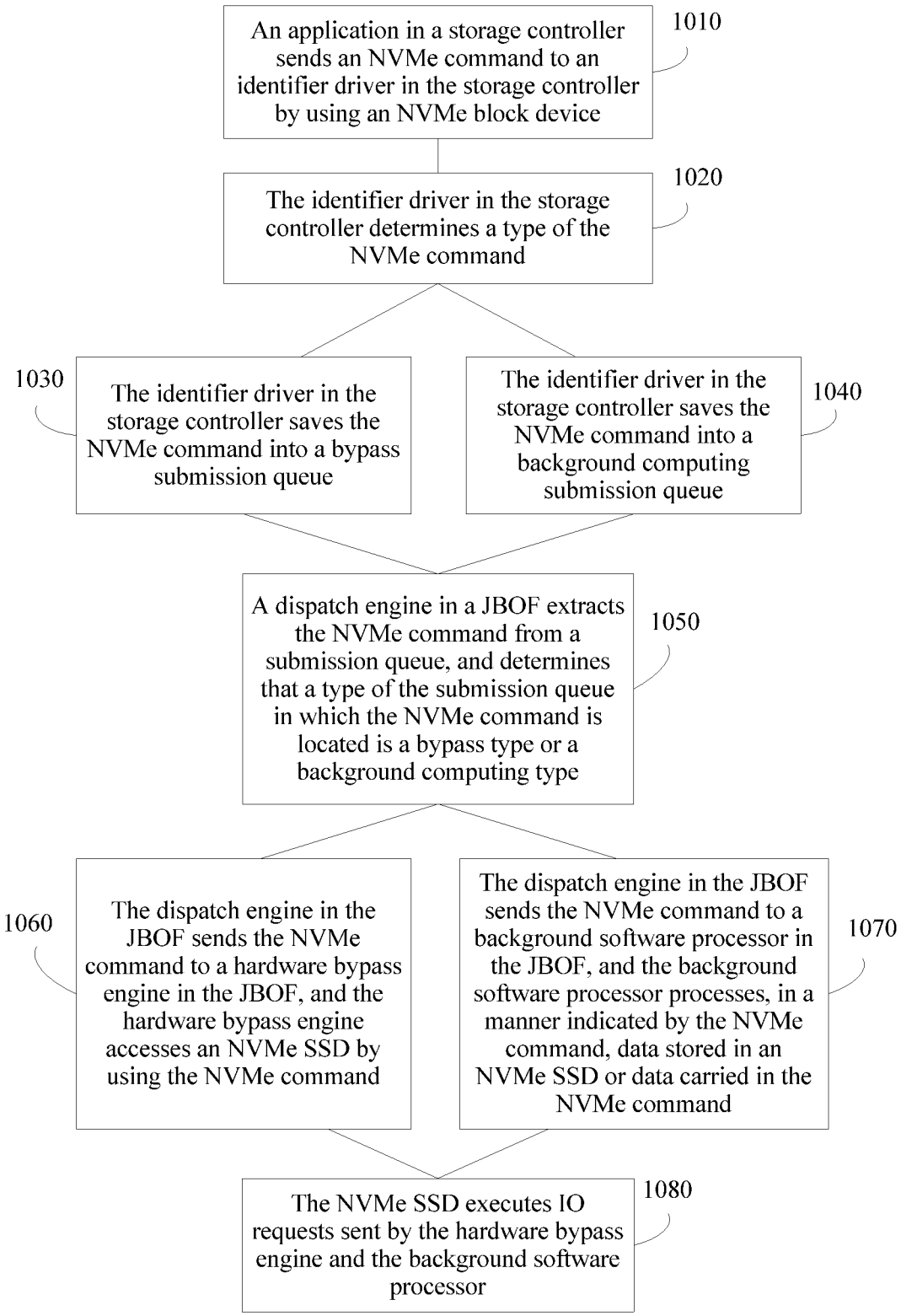
FIG. 10 is a schematic flowchart of a method for transmitting an NVMe command according to an embodiment of this application.

FIG. 9 is a schematic flowchart of a method for transmitting an NVMe command according to an embodiment of this application. The method shown in FIG. 9 includes the following steps.

910. A command queue initiator driver in a storage controller creates two types of submission queues in the storage controller, where the submission queue is used to transmit an NVMe command stored in the submission queue to a JBOF.

Further, indication information indicating a queue type may be added to a field (for example, a field double word 11 (Dword 11)) in a submission queue creation command. For a specific adding manner, refer to Table 1. When a value of a bit in the submission queue creation command is 00b, the bit is used to indicate that a queue type of the submission queue is a bypass type and the bypass submission queue is used to store a bypass NVMe command, and when a value of a bit in the submission queue creation command is 01b, the bit is used to indicate that a queue type of the submission queue is a background computing NVMe command.

TABLE 1

| Bit | Description | | |
|---|---|---|---|
| 04:03 | Queue type | | |
| | Value | Definition | |
| | 00b | Bypass type | |
| | 01b | Background computing type | |
| | 10b | Reserved | |
| | 11b | Reserved | |

It should be noted that one of the foregoing two types of submission queues may correspond to at least one submission queue.

Accordingly, the JBOF may also use the submission queue creation command to create different types of submission queues in the JBOF. The submission queue of the JBOF and the submission queue of the storage controller jointly transmit a data processing request from the storage controller to the JBOF.

920. The command queue initiator driver in the storage controller separately creates context information for different types of submission queues, where the context information includes storage addresses occupied by the different types of submission queues and storage addresses occupied by completion queues corresponding to the different types of submission queues.

930. The command queue initiator driver in the storage controller initializes a bypass submission queue and a bypass completion queue.

Further, the command queue initiator driver in the storage controller sends the context information of the bypass submission queue to the JBOF, to create, in the JBOF, a bypass submission queue corresponding to a bypass submission queue of the storage controller.

940. The command queue initiator driver in the storage controller initializes a background computing submission queue and a background computing completion queue.

Further, the command queue identifier driver in the storage controller sends the context information of the background computing submission queue to the JBOF, to create, in the JBOF, a background computing submission queue corresponding to a background computing submission queue of the storage controller.

A method for transmitting an NVMe command in an embodiment of this application is described below with reference to FIG. 10 using an example in which an NVMe command is an IO request. FIG. 10 is a schematic flowchart of a method for transmitting an NVMe command according to an embodiment of this application. The method shown in FIG. 10 includes the following steps.

1010. An application in a storage controller sends an NVMe command to a command queue initiator driver in the storage controller using an NVMe block device.

1020. The command queue initiator driver in the storage controller determines a type of the NVMe command.

Further, if the NVMe command is a bypass type, step 1030 is performed, and if the NVMe command is a background computing type, step 1040 is performed.

1030. The command queue initiator driver in the storage controller saves the NVMe command into a bypass submission queue.

1040. The command queue initiator driver in the storage controller saves the NVMe command into a background computing submission queue.

1050. A dispatch engine in a JBOF extracts the NVMe command from a submission queue, and determines that a type of the submission queue in which the NVMe command is located is a bypass type or a background computing type.

Further, if the type of the submission queue in which the NVMe command is located is the bypass type, step 1060 is performed, and if the type of the submission queue in which the NVMe command is located is the background computing type, step 1070 is performed.

1060. The dispatch engine in the JBOF sends the NVMe command to a hardware bypass engine in the JBOF, and the hardware bypass engine accesses an NVMe SSD using the NVMe command.

1070. The dispatch engine in the JBOF sends the NVMe command to a background software processor in the JBOF, and the background software processor processes, in a manner indicated by the NVMe command, data stored in an NVMe SSD or data carried in the NVMe command.

Further, the background software processor processes the NVMe command, unloads a background task performed by the storage controller, generates a new IO request, and uses the new IO request to access the NVMe SSD using the block device.

1080. The NVMe SSD executes IO requests sent by the hardware bypass engine and the background software processor.

The method for transmitting a data processing request in the embodiments of this application is described in detail above with reference to FIG. 1 to FIG. 10. An apparatus for transmitting a data processing request in the embodiments of this application is briefly described below with reference to FIG. 11 to FIG. 14. It should be understood that apparatuses shown in FIG. 11 to FIG. 14 may implement the foregoing methods. For brevity, details are not described herein again.

Figure 11:
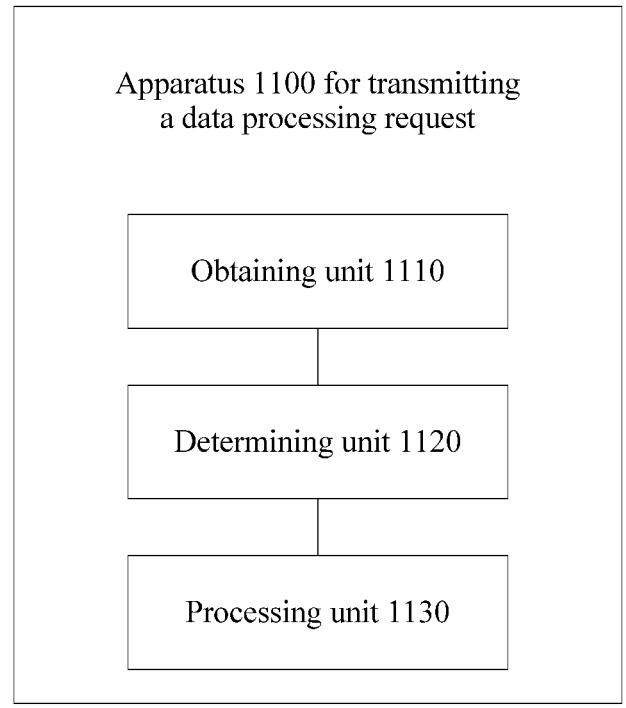
FIG. 11 is a schematic block diagram of an apparatus for transmitting a data processing request according to an embodiment of this application.

FIG. 11 is a schematic block diagram of an apparatus for transmitting a data processing request according to an embodiment of this application. An apparatus 1100 for transmitting a data processing request shown in FIG. 11 includes an obtaining unit 1110, a determining unit 1120, and a processing unit 1130.

The obtaining unit is configured to obtain a data processing request sent by a storage controller, where the data processing request is used to access a target solid-state drive SSD in the JBOF.

The determining unit is configured to determine a type of the data processing request obtained by the obtaining unit, where the type of the data processing request includes a bypass type and a background computing type.

The processing unit is configured to, if the type of the data processing request is the bypass type, directly forward the data processing request to the target SSD.

The processing unit is further configured to, if the type of the data processing request is the background computing type, send the data processing request to a computing unit in the JBOF, and send the data processing request processed by the computing unit to the target SSD.

It should be noted that the determining unit may be the dispatch engine shown in FIG. 4.

Optionally, in an embodiment, the determining unit is further configured to, if the data processing request comes from a bypass submission queue of the storage controller, determine that the type of the data processing request is the bypass type, or if the data processing request comes from a background computing submission queue of the storage controller, determine that the type of the data processing request is the background computing type.

Optionally, in an embodiment, the processing unit is further configured to extract the data processing request from a bypass submission queue of the JBOF, where the type of the data processing request is the bypass type, directly forward the data processing request to the target SSD, extract the data processing request from a background computing submission queue of the JBOF, where the type of the data processing request is the background computing type, and send the data processing request to the computing unit in the JBOF, and send the data processing request processed by the computing unit to the target SSD.

Optionally, in an embodiment, the determining unit is further configured to, if the data processing request is a write request, determine that the type of the data processing request is the background computing type, or if the data processing request is a read request, determine that the type of the data processing request is the bypass type.

Figure 12:
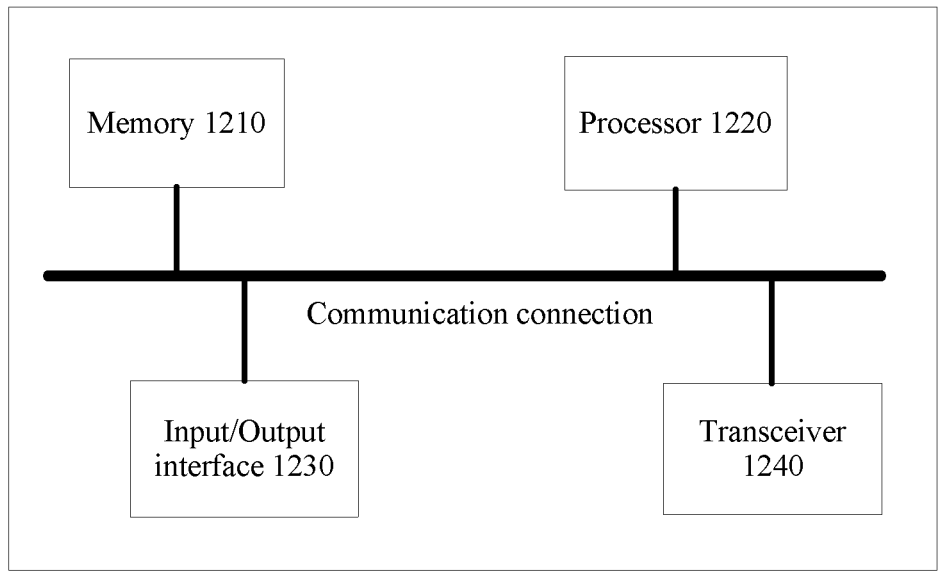
FIG. 12 is a schematic block diagram of an apparatus for transmitting a data processing request according to another embodiment of this application.

In an optional embodiment, the obtaining unit 1110 may be a transceiver 1240, the determining unit 1120 and the processing unit 1130 may be a processor 1220, and the apparatus for transmitting a data processing request may further include an input/output interface 1230 and a memory 1210, which are shown in FIG. 12.

FIG. 12 is a schematic block diagram of an apparatus for transmitting a data processing request according to another embodiment of this application. The apparatus for transmitting a data processing request 1200 shown in FIG. 12 may include a memory 1210, a processor 1220, an input/output interface 1230, and a transceiver 1240. The memory 1210, the processor 1220, the input/output interface 1230, and the transceiver 1240 are connected using an internal connection path. The memory 1210 is configured to store an instruction. The processor 1220 is configured to execute the instruction stored in the memory 1220, to control the input/output interface 1230 to receive input data and information, output data such as an operation result, and the like, and to control the transceiver 1240 to send a signal.

The transceiver 1240 is configured to obtain a data processing request sent by a storage controller, where the data processing request is used to access a target solid-state drive SSD in the JBOF.

The processor 1220 is configured to determine a type of the data processing request obtained by the transceiver, where the type of the data processing request includes a bypass type and a background computing type.

The processor 1220 is configured to, if the type of the data processing request is the bypass type, directly forward the data processing request to the target SSD.

The processing unit 1220 is further configured to, if the type of the data processing request is the background computing type, send the data processing request to a computing unit in the JBOF, and send the data processing request processed by the computing unit to the target SSD.

It should be understood that, in this embodiment of this application, the processor 1220 may be a universal CPU, a microprocessor, an ASIC, or one or more integrated circuits, and is configured to execute a related program, to implement the technical solution provided in this embodiment of this application.

It should be further understood that the transceiver 1240 is also referred to as a communications interface, and a transceiver apparatus such as a transceiver is used to implement communication between the apparatus 1200 and another device or a communications network.

The memory 1210 may include a read-only memory and a random access memory, and provide an instruction and data for the processor 1220. A part of the processor 1220 may further include a non-volatile random access memory. For example, the processor 1220 may further store information of a device type.

In an implementation process, steps in the foregoing methods can be implemented using an integrated logical circuit of hardware in the processor 1220, or using instructions in a form of software. The methods for transmitting a data processing request disclosed in the embodiments of this application may be directly performed by a hardware processor, or may be performed by a combination of hardware and software modules in the processor. The software module may be located in a mature storage medium in the art, such as a random access memory, a flash memory, a read-only memory, a programmable read-only memory, an electrically erasable programmable memory, a register, or the like. The storage medium is located in the memory 1210, and the processor 1220 reads information in the memory 1210 and completes the steps in the foregoing methods in combination with hardware of the processor. To avoid repetition, details are not described herein again.

It should be understood that, the processor in this embodiment of the present application may be a CPU, or may be another general purpose processor, a digital signal processor (DSP), an ASIC, a FPGA or another programmable logical device, a discrete gate or a transistor logical device, a discrete hardware component, or the like. The general purpose processor may be a microprocessor, or the processor may be any conventional processor or the like.

Figure 13:
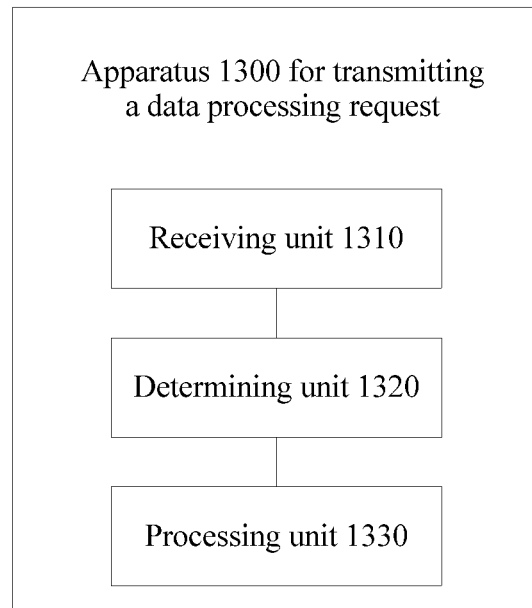
FIG. 13 is a schematic block diagram of an apparatus for transmitting a data processing request according to an embodiment of this application.

FIG. 13 is a schematic block diagram of an apparatus for transmitting a data processing request according to an embodiment of this application. An apparatus 1300 for transmitting a data processing request shown in FIG. 13 includes a receiving unit 1310, a determining unit 1320, and a processing unit 1330.

The receiving unit is configured to receive a data processing request, where the data processing request is used to access a target solid-state drive SSD in a solid-state drive cluster JBOF controlled by the storage controller.

The determining unit is configured to determine a type of the data processing request received by the receiving unit, where the type of the data processing request includes a bypass type and a background computing type.

The processing unit is configured to, if the type of the data processing request is the bypass type, process the data processing request, and place the processed data processing request in a bypass submission queue of the storage controller.

The processing unit is further configured to, if the type of the data processing request is the background computing type, place the data processing request in a background computing submission queue of the storage controller.

Figure 14:
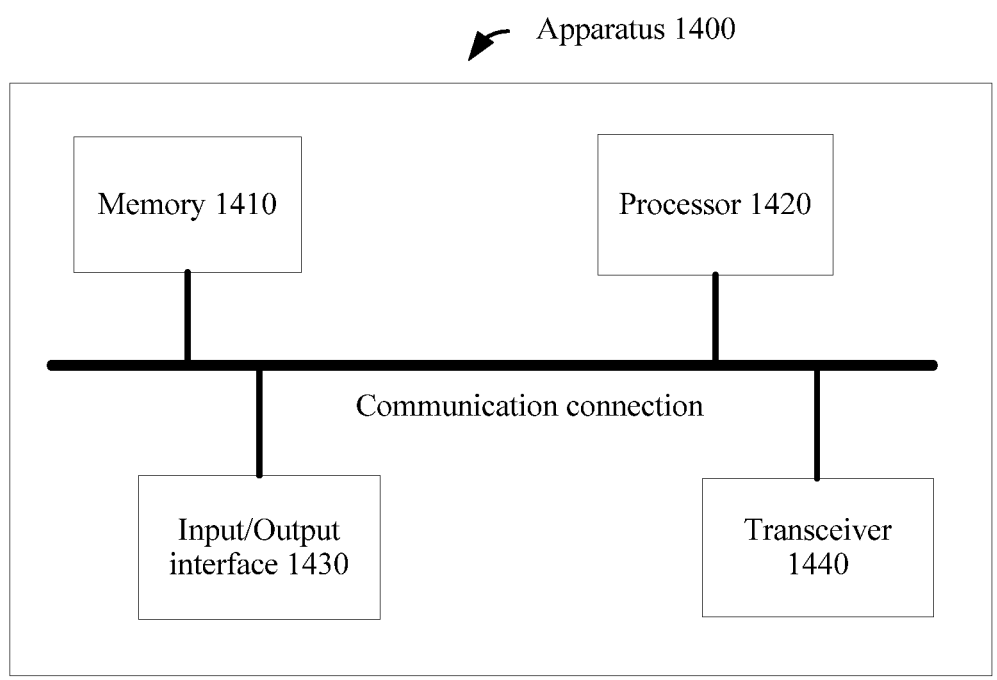
FIG. 14 is a schematic block diagram of an apparatus for transmitting a data processing request according to another embodiment of this application.

In an optional embodiment, the receiving unit 1310 may be a transceiver 1440, the processing unit 1330 and the determining unit 1320 may be a processor 1420, and the apparatus for transmitting a data processing request may further include an input/output interface 1430 and a memory 1410, which are shown in FIG. 14.

FIG. 14 is a schematic block diagram of an apparatus for transmitting a data processing request according to another embodiment of this application. An apparatus 1400 for transmitting a data processing request shown in FIG. 14 may include a memory 1410, a processor 1420, an input/output interface 1430, and a transceiver 1440. The memory 1410, the processor 1420, the input/output interface 1430, and the transceiver 1440 are connected using an internal connection path. The memory 1410 is configured to store an instruction. The processor 1420 is configured to execute the instruction stored in the memory 1410, to control the input/output interface 1430 to receive input data and information, output data such as an operation result, and the like, and to control the transceiver 1440 to send a signal.

The transceiver 1440 is configured to receive a data processing request, where the data processing request is used to access a target solid-state drive SSD in a solid-state drive cluster JBOF controlled by the storage controller.

The processor 1420 is configured to determine a type of the data processing request received by the transceiver, where the type of the data processing request includes a bypass type and a background computing type.

The processor 1420 is configured to, if the type of the data processing request is the bypass type, process the data processing request, and place the processed data processing request in a bypass submission queue of the storage controller.

The processor 1420 is further configured to, if the type of the data processing request is the background computing type, place the data processing request in a background computing submission queue of the storage controller. It should be understood that, in this embodiment of this application, the processor 1420 may be a CPU, a microprocessor, an ASIC, or one or more integrated circuits, and is configured to execute a related program, to implement the technical solution provided in this embodiment of this application.

It should be further understood that the transceiver 1440 is also referred to as a communications interface, and a transceiver apparatus such as a transceiver is used to implement communication between the apparatus 1400 and another device or a communications network.

The memory 1410 may include a read-only memory and a random access memory, and provide an instruction and data for the processor 1420. A part of the processor 1420 may further include a non-volatile random access memory. For example, the processor 1420 may further store information of a device type.

In an implementation process, steps in the foregoing methods can be implemented using an integrated logical circuit of hardware in the processor 1420, or using instructions in a form of software. The methods for transmitting a data processing request disclosed in the embodiments of this application may be directly performed by a hardware processor, or may be performed by a combination of hardware and software modules in the processor. The software module may be located in a mature storage medium in the art, such as a random access memory, a flash memory, a read-only memory, a programmable read-only memory, an electrically erasable programmable memory, a register, or the like. The storage medium is located in the memory 1410, and the processor 1420 reads information in the memory 1410 and completes the steps in the foregoing methods in combination with hardware of the processor. To avoid repetition, details are not described herein again.

It should be understood that, the processor in this embodiment of the present application may be a CPU, or may be another general purpose processor, a DSP, an application-specific integrated circuit ASIC, a FPGA or another programmable logical device, a discrete gate or a transistor logical device, a discrete hardware component, or the like. The general purpose processor may be a microprocessor, or the processor may be any conventional processor or the like.

It should be understood that in the embodiments of this application, "B corresponding to A" indicates that B is associated with A, and B may be determined based on A. However, it should further be understood that determining B based on A does not mean that B is determined based on A only, and B may also be determined based on A and/or other information.

It should be understood that the term "and/or" in this specification describes only an association relationship for describing associated objects and represents that three relationships may exist. For example, A and/or B may represent the following three cases. Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, a magnetic tape), an optical medium (for example, a digital versatile disc (DVD)), or a semiconductor medium (for example, a SSD), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for transmitting a data processing request implemented by a just a bunch of flash (JBOF) solid state drive cluster (SSD) comprising:
    obtaining a data processing request of a plurality of data processing requests from a storage controller outside the JBOF, wherein the data processing request is for accessing a target solid-state drive (SSD) in the JBOF; and
    determining a type of the data processing request; and
    based on a determination the type of the data processing request is a background computing type, sending, by the JBOF, the data processing request to a computing unit in the JBOF for processing, and sending the processed data processing request to the target SSD.

2. The method of claim 1, further comprising forwarding the data processing request to the target SSD based on a determination the type of the data processing request is a bypass type.

3. The method of claim 2, wherein forwarding the data processing request to the target SSD comprises extracting the data processing request from a bypass submission queue of the JBOF based on a determination the type of the data processing request is the bypass type.

4. The method of claim 1, further comprising determining that the type of the data processing request is the bypass type based on a determination the data processing request comes from a bypass submission queue of the storage controller.

5. The method of claim 1, further comprising determining that the type of the data processing request is the background computing type based on a determination the data processing request comes from a background computing submission queue of the storage controller.

6. The method of claim 1, wherein the computing unit comprises a processor, and wherein based on a determination the type of the data processing request is the background computing type, the method further comprises:
    extracting the data processing request from a background computing submission queue of the JBOF;
    sending the data processing request to the processor in the JBOF;
    processing the data processing request at the processor to obtain the processed data processing request; and
    sending the processed data processing request to the target SSD.

7. The method of claim 1, further comprising determining that the type of the data processing request is the background computing type based on a determination the data processing request is a write request.

8. The method of claim 1, further comprising determining that the type of the data processing request is the bypass type based on a determination the data processing request is a read request.

9. A just a bunch of flash solid-state drive cluster (JBOF), comprising:

a processor; and
a memory coupled to the processor and storing instructions that, when executed by the processor, cause the JBOF to be configured to:
    obtain a data processing request of a plurality of data processing requests from a storage controller outside the JBOF, wherein the data processing request is for accessing a target solid-state drive (SSD) in the JBOF;
    determine a type of the data processing request; and
    send the data processing request to a computing unit in the JBOF for processing and send the processed data processing request to the target SSD based on a determination the type of the data processing request is a background computing type.

10. The JBOF of claim 9, wherein the instructions further cause the JBOF to be configured to forward the data processing request to the target SSD when the type of the data processing request is a bypass type.

11. The JBOF of claim 9, wherein the instructions further cause the JBOF to be configured to extract the data processing request from a bypass submission queue of the JBOF when the type of the data processing request is a bypass type.

12. The JBOF of claim 9, wherein the computing unit comprises a second processor, and wherein when the type of the data processing request is the background computing type, the instructions further cause the JBOF to be configured to:
    send the data processing request to the second processor;
    process the data processing request at the second processor to obtain the processed data processing request; and
    send the processed data processing request to the target SSD.

13. The JBOF of claim 9, wherein the instructions further cause the JBOF to be configured to determine that the type of the data processing request is a bypass type when the data processing request comes from a bypass submission queue of the storage controller.

14. The JBOF of claim 9, wherein the instructions further cause the JBOF to be configured to determine that the type of the data processing request is the background computing type when the data processing request comes from a background computing submission queue of the storage controller.

15. The JBOF of claim 9, wherein the computing unit comprises a second processor, wherein the instructions further cause the JBOF to be configured to:
    extract the data processing request from a background computing submission queue of the JBOF when the type of the data processing request is the background computing type;
    send the data processing request to the second processor;
    process the data processing request at the second processor to obtain the processed data processing request; and
    send the processed data processing request to the target SSD.

16. The JBOF of claim 9, wherein the instructions further cause the JBOF to be configured to determine that the type of the data processing request is the background computing type when the data processing request is a write request.

17. The JBOF of claim 9, wherein the instructions further cause the JBOF to be configured to determine that the type of the data processing request is a bypass type when the data processing request is a read request.

18. A storage controller, comprising:
a processor; and a memory coupled to the processor and storing instructions that, when executed by the processor, cause the storage controller to be configured to:
receive a data processing request from a host, wherein the data processing request is for accessing a target solid-state drive (SSD) in a solid-state drive cluster (JBOF) controlled by the storage controller;
determine a type of the data processing request based on receiving the data processing request;
process the data processing request; and
place the data processing request in a background computing submission queue of the storage controller outside the JBOF when the type of the data processing request is a background computing type to enable the JBOF to send the data processing request to a computing unit in the JBOF for processing, and to send the processed data processing request to the target SSD based on a determination the type of the data processing request is a background computing type.

19. The storage controller of claim 18, wherein the instructions further cause the storage controller to determine that the type of the data processing request is the background computing type when the data processing request is a write request.

20. The storage controller of claim 18, wherein the instructions further cause the storage controller to determine that the type of the data processing request is a bypass type when the data processing request is a read request.

* * * * *